Oct. 29, 1957
G. D. CALKINS
2,811,411
METHOD OF PROCESSING MONAZITE SAND
Filed Oct. 16, 1951
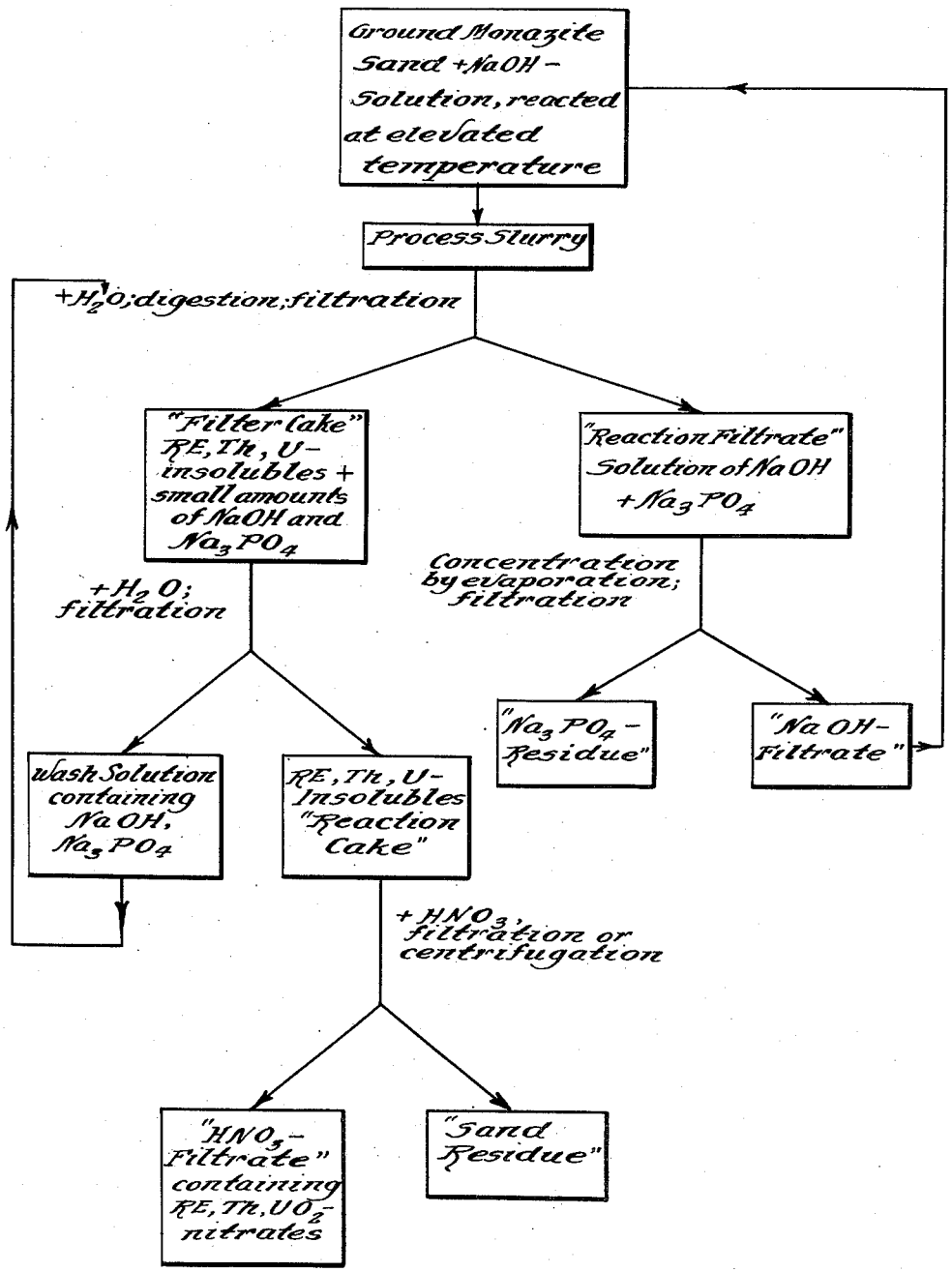
INVENTOR.
George D. Calkins
BY
Roland A. Anderson
Attorney United States Patent Office 2,811,411
Patented Oct. 29, 1957

2,811,411

METHOD OF PROCESSING MONAZITE SAND

George D. Calkins, Worthington, Ohio, assignor to the United States of America as represented by the United States Atomic Energy Commission Application October 16, 1951, Serial No. 251,564

1 Claim. (Cl. 23—14.5)

This invention deals with a method of processing monazite sand and in particular with a method comprising the pretreatment of monazite sand with sodium hydroxide followed by the separate recovery of the various ingredients contained in this ore.

Monazite sand is a naturally occurring phosphatic ore consisting mainly of rare earth phosphates and relatively smaller quantities of thorium and uranium phosphates. Due to the insolubility of the thorium, uranium and rare earth phosphates, the recovery of these metals requires pretreatment for the conversion of the phosphates into soluble form prior to processing for recovery proper.

When monazite sand is reacted with a sodium hydroxide solution, the thorium, uranium and rare earth phosphates are converted to water-insoluble, and especially, to sodium hydroxide-insoluble compounds; these insolubles are mostly hydrous oxides; but in the case of uranium, the insoluble compound may, at least partly, consist of a slightly soluble uranate. The phosphate anion forms sodium phosphate. In order to obtain complete conversion, a great excess of sodium hydroxide is necessary; this entails the disadvantage that the uranium is dissolved to a certain degree whereby a considerable loss of uranium may occur.

It is an object of this invention to provide a process for the recovery of thorium, rare earth and uranium values from monazite sand which has a high degree of efficiency and is very economical.

It is also an object of this invention to provide a process for the separation and recovery of thorium, rare earth and uranium values wherein the losses of uranium are relatively low.

According to the process of this invention, finely disintegrated monazite sand is treated with an excess of aqueous sodium hydroxide solution at elevated temperature whereby water-soluble sodium phosphate and water-insoluble compounds of thorium, uranium and rare earth elements are formed, and these insolubles are separated from the aqueous solution containing said excess of sodium hydroxide and the sodium phosphate formed; this aqueous solution is then concentrated whereby sodium phosphate crystallizes out, the crystals are removed from the remaining sodium hydroxide solution, and the sodium hydroxide solution is recycled for reaction with a new supply of monazite sand.

In the attached drawing a flow diagram is given for the purpose of illustrating the essential steps of the process of this invention. This diagram is self-explanatory.

It has been found that the particle size of the monazite sand has a great bearing on the efficiency of the sodium hydroxide reaction and that the attack by the sodium hydroxide is more complete and a shorter reaction time is required if the sand is finely ground. Moreover, less severe reaction conditions can be used when a finer sand is employed. Thus, a lower reaction temperature, a lower sodium hydroxide concentration, and less excess of sodium hydroxide are required if the particle size of the sand is reduced. The use of lower reaction temperature entails still another advantage, namely, that the thorium compound formed after reaction is not converted to an acid-insoluble form as is likely to happen at excessive temperatures and that thus all thorium remains in an accessible form during processing. A particle size of —200 mesh for 100% of the sand and —325 mesh for from 95 to 98% of the sand has been found preferable. Grinding may be carried out by any method known in the art, for instance, by wet-grinding in a ball mill.

As has been mentioned before, a great excess of sodium hydroxide is necessary for satisfactory reaction. An excess ranging from at least 200% to up to 500%, with regard to the phosphates to be converted, has been found suitable. In other words, a weight ratio of sodium hydroxide:sand of from 1.5 to 3 has been found satisfactory, a ratio between 2 and 3 being preferred. Best results were obtained with a ratio of 2.

The concentration of the sodium hydroxide solution may range from 30 to 70%; however, a concentration between 30 and 45% has given the best results. It is advantageous to agitate the reaction mixture during the reaction, and it is also advisable to use a container having a foam-breaking device, because the mass has a tendency to foam during reaction.

Elevated temperature is necessary for efficient reaction, and temperatures between 135° and 220° C. are suitable. The reaction time is dependent upon the temperature used and ranges from one to three hours. For a reaction temperature of about 165° C., one hour was sufficient; for that of 155° C., reaction was completed after one and one-half hours, while for a reaction temperature of about 140° C. the temperature had to be maintained for two to three hours. Excellent results have been obtained by treatment for three hours at 135° C.

After completion of the reaction, the reaction mass, or the so-called process slurry, is prepared for filtration whereby the sodium hydroxide and sodium phosphate are to be separated from an insoluble residue. For this purpose, the process slurry is first diluted with water; a quantity of water so that about one liter of solution is obtained per 100 g. of sand is suitable. This concentration represents the optimum with regard to the removal of sodium phosphate and sodium hydroxide and to the minimum solubility of uranium, the latter increasing with an increase of sodium hydroxide concentration and also with an increase of the quantity of liquid. Moreover, in order to obtain a maximum solubility of sodium phosphate in the sodium hydroxide solution, the solution is advantageously kept at a temperature of about 110° C. At this temperature and the dilution given above, it was possible to hold most of the sodium phosphate in solution.

Before filtering the diluted process slurry, it is advantageous to maintain it at about 100° to 110° C. for approximately one hour for "digestion"; by this, the filtering characteristics are improved. Without digestion, as has been found, some of the particles of the slurry are so small that they will pass, for instance, through a stainless steel filtering disc that has an average pore size of 10 microns; this does not occur after digestion.

Filtration is preferably carried out at elevated temperature; a temperature of about 100° C. represents the optimal conditions, because the sodium phosphate is then best soluble in the sodium hydroxide solution. This means that at this high temperature the dilution of the sodium hydroxide solution can be kept relatively low which involves a saving in evaporation for concentration later on. By the filtration step, the diluted process slurry is separated into the "filter cake," which contains the rare earth, thorium, and uranium insolubles and very small amounts of sodium phosphate and sodium hydroxide, and the "reaction filtrate," which essentially contains only sodium hydroxide and sodium phosphate.

The reaction filtrate is concentrated by evaporation. This is done for two purposes, firstly, in order to make the sodium hydroxide suitable for recycling and secondly, to remove the sodium phosphate from the sodium hydroxide. It was found that evaporation to a concentration of about 0.5 liter of liquid per 100 g. of monazite sand is satisfactory for this purpose.

The sodium phosphate is then precipitated by crystallization. For this purpose, the concentrated solution is allowed to cool to room temperature which is about 25° C. The product obtained is $Na_3PO_4 \cdot 10H_2O$; it usually is contaminated by small quantities of uranium which represent a loss in uranium. By recrystallizing the sodium phosphate twice, the uranium loss could be reduced, and a product containing from 0.1 to 0.4% of the total uranium content originally present in the monazite sand could be obtained.

The concentration of the sodium hydroxide during crystallization has been found to have a noticeable effect on the loss of uranium with the phosphate crystals. It has been found that from more concentrated solutions a denser phosphate, namely, $Na_3PO_4 \cdot 10H_2O$ crystallizes out which—without recrystallization—contains uranium in quantities amounting to a loss of about 2%. From less concentrated sodium hydroxide solutions, a less dense sodium phosphate precipitates which has a higher affinity for the uranium and causes losses up to about 10%. For instance, in a set of two parallel experiments, the following results were obtained: From an 8 N sodium hydroxide solution 47% of the uranium present in the solution was found in the sodium phosphate crystals, while from a 23 N sodium hydroxide solution only 11% of the uranium was present in the crystal mass. For this reason, the sodium hydroxide concentration, prior to crystallization, should be at least 10 N.

By the crystallization step the sodium phosphate could be removed almost completely. In one run, when a 500% excess of sodium hydroxide, a ratio of sand:water:sodium hydroxide of 1:2:3 and a reaction temperature of 215° C. had been used for the reaction, 95% of the sodium phosphate contained in the "reaction filtrate" was removed by crystallization from a 50% solution of sodium hydroxide at its boiling point. The $Na_3PO_4 \cdot 10H_2O$ crystals contained 2.5% of the sodium hydroxide present in the solution and about 1% of the uranium present in the sand.

The phosphate crystals are removed from the sodium hydroxide solution by filtration. This step should be carried out immediately after crystal precipitation because the uranium loss increases with increasing storage time. A sodium hydroxide solution which had remained in contact with the phosphate crystals for twenty-four hours before filtration yielded a uranium loss of 6%, while with a solution of the same composition but which was filtered immediately after precipitation of the crystals, the uranium loss was only 1%.

The "sodium hydroxide-filtrate" which is practically free of sodium phosphate is then, according to this invention, recycled by introducing it back into the reaction vessel for reaction with a new supply of monazite sand. The sodium hydroxide, however, may first be subjected to further concentration prior to recycling if desired. The "$Na_3PO_4$ residue" is a valuable by-product.

The "filter cake" which mainly contains the rare earths, thorium and uranium insolubles and minor quantities of sodium phosphate and sodium hydroxide is washed with water for removal of the phosphate and hydroxide, and the wash solution is then filtered off. A quantity of about 1.7 liters of wash water per 100 g. of monazite sand has proved suitable. This wash solution containing the hydroxide and the phosphate may also be recycled and be used, for instance, instead of part of the water necessary for diluting the process slurry. By this the sodium phosphate recovery is more complete and evaporation of excessive volumes of solutions is not necessary.

The separated washed residue is dissolved in mineral acid for the purpose of recovering the rare earth, thorium and uranium values. Hydrochloric acid and nitric acid are well suited for this purpose; for instance, a 36% hydrochloric acid or a 70% nitric acid was found satisfactory. Preferred conditions for this step were 90–100° C. maintained for about one-half hour. The mixture is then diluted and the sand residue removed from the nitric acid solution either by filtration or by centrifuging to obtain the "nitric acid filtrate." The rare earth, thorium and uranium values may then be recovered from the solution by various methods, for instance, by solvent extraction. This phase of the process, however, is not part of the invention.

In the following, an example of the process of the invention is given for illustrative purposes only. This example shows that recycling of the sodium hydroxide does not impair the recovery of thorium, uranium and rare earth values.

EXAMPLE

Brazilian monazite sand was used about 80% of which passed a 270-mesh screen. The composition of the monazite sand is given in Table I.

Table I

| Constituent [1] | Percent | Constituent [2] | Percent |
|---|---|---|---|
| $ThO_2$ | 6.26 | $Al_2O_3$ | 0.03–0.10 |
| $U_3O_8$ | 0.31 | $ZrO_2$ | 0.05–0.15 |
| Rare earth oxides | 58.2 | $CaO$ | 0.10–1.0 |
| $P_2O_5$ | 27.2 | $MgO$ | 0.01–0.05 |
| $Fe_2O_3$ | 2.6 | $MnO$ | 0.01–0.03 |
| $TiO_2$ | 3.3 | $PbO$ | 0.03–0.10 |
| $SiO_2$ | 2.0 | $Na_2O$ | <0.2 |
|  |  | $K_2O$ | <0.2 |
|  |  | $Cr_2O_3$ | 0.001–0.005 |
|  |  | $CuO$ | 0.001–0.01 |

[1] Determined by chemical analysis.
[2] Determined by spectrographic analysis.

Three 100-g. batches of the monazite sand were used for three cycles of the process. The conditions used are compiled in Table II.

Table II

| Cycle No. | 1 | 2 | 3 |
|---|---|---|---|
| Ratio, NaOH:sand | 3 | 3 | 3 |
| Ratio, $H_2O$:sand (at start) | 2 | 2 | 2 |
| Dilution volume, ml. | 1,000 | 1,000 | 1,000 |
| Digestion time, hrs. | 1 | 1 | 1 |
| Volume of wash, ml. for filter cake | 2,000 | 2,000 | 2,000 |
| Volume of $HNO_3$, ml. for filter cake | 600 | 700 | 600 |
| Concn. of $HNO_3$, percent | 44 | 26 | 44 |
| Number of recrystallizations of $Na_3PO_4$ | 2 | 2 | 3 |

The results are compiled in Table III. All of the percentages are based on the total sand used for the three cycles.

Table III

|  | $ThO_2$, percent | $U_3O_8$, percent | Rare Earth Oxides, percent | $P_2O_5$, percent |
|---|---|---|---|---|
| FIRST CYCLE |  |  |  |  |
| $HNO_3$ filtrate | 32 | 30 | 30 | 0.9 |
| $Na_3PO_4$ residue |  | 0.4 |  | 28 |
| SECOND CYCLE |  |  |  |  |
| $HNO_3$ filtrate | 16 | 24 | 30 | 0.2 |
| $Na_3PO_4$ |  | 4 |  | 32 |

THIRD CYCLE

| | | | | |
|---|---|---|---|---|
| HNO₃ filtrate | 23 | 29 | 27 | 0.2 |
| Na₃PO₄ residue | | 6 | | 32 |
| NaOH filtrate | | 7 | | 2.0 |
| Sand residue | 28 | 1.5 | 5 | 1.3 |

TOTALS

| | | | | |
|---|---|---|---|---|
| HNO₃ filtrate | 71 | 83 | 87 | 1.3 |
| Na₃PO₄ residue | | 10 | | 92 |
| NaOH filtrate | | 7 | | 2.0 |
| Sand residue | 28 | 1.5 | 5 | 1.3 |
| Over-all total | 99 | 102 | 92 | 97 |

Comparison of the second and third cycles with the first cycle in this table shows the effect of thorough washing of the reaction mass. The residue from the caustic soda reaction was resuspended in the wash solution in the last two cycles but not in the first one. The amount of phosphorus in the nitric acid solution was decreased by the washing step.

It will be understood that this invention is not to be limited to the details given herein but that it may be modified within the scope of the appended claim.

What is claimed is:

In a process for preparing monazite sand for the recovery of various components, the steps of treating finely disintegrated monazite sand having a particle size of not greater than —200 mesh with an excess of aqueous sodium hydroxide solution containing from 30 to 70% of sodium hydroxide at elevated temperature of between 135° and 220° C. whereby water-soluble sodium phosphate and water-insoluble compounds of thorium, uranium and rare earth elements are formed, separating said insolubles from the aqueous solution containing excess sodium hydroxide and the sodium phosphate formed, concentrating said aqueous solution so that the sodium hydroxide is present in a concentration of about 23 N and thereafter cooling it whereby sodium phosphate crystals precipitate, removing said sodium phosphate crystals from the remaining sodium hydroxide solution immediately after precipitation, and recycling said sodium hydroxide solution for reaction with a new supply of monazite sand.

References Cited in the file of this patent

UNITED STATES PATENTS

| | | |
|---|---|---|
| 617,636 | Buddeus | Jan. 10, 1899 |
| 2,196,593 | Muskat | Apr. 9, 1940 |

FOREIGN PATENTS

| | | |
|---|---|---|
| 39,105 | India | Mar. 22, 1949 |

OTHER REFERENCES

Lunge: Sulphuric Acid and Alkali, vol. 2 part 2, 3rd ed., pp. 871–879 (1909). Pub. by Gurney & Jackson, London.